(No Model.) 2 Sheets—Sheet 1.
D. M. HARRIS.
MACHINE FOR CLEARING THE SIDES OF RAILROAD TRACKS.
No. 325,340. Patented Sept. 1, 1885.
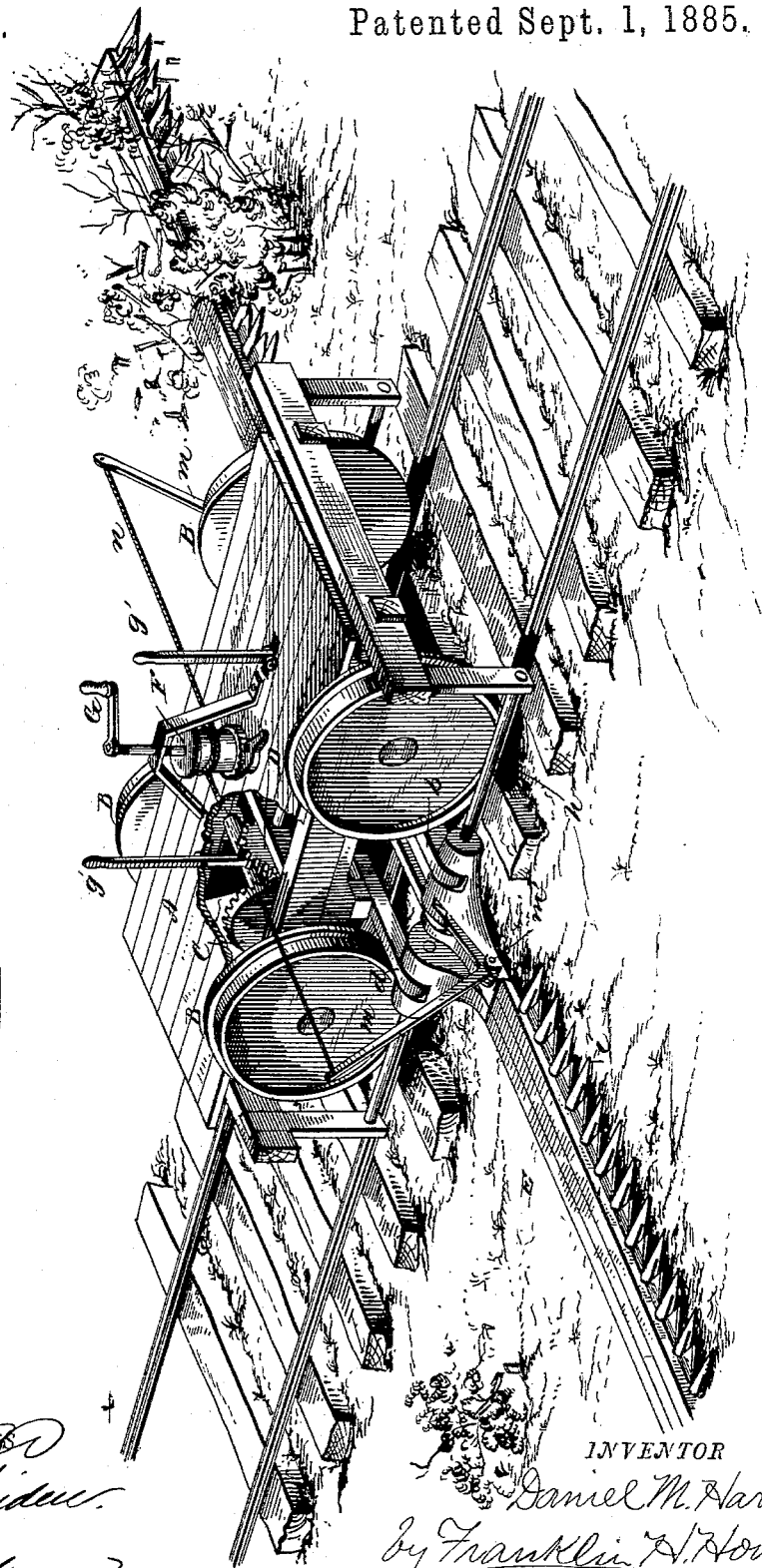
WITNESSES
INVENTOR
Daniel M. Harris
by Franklin H. Hough
Attorney (No Model.) 2 Sheets—Sheet 2.
D. M. HARRIS.
MACHINE FOR CLEARING THE SIDES OF RAILROAD TRACKS.
No. 325,340. Patented Sept. 1, 1885.
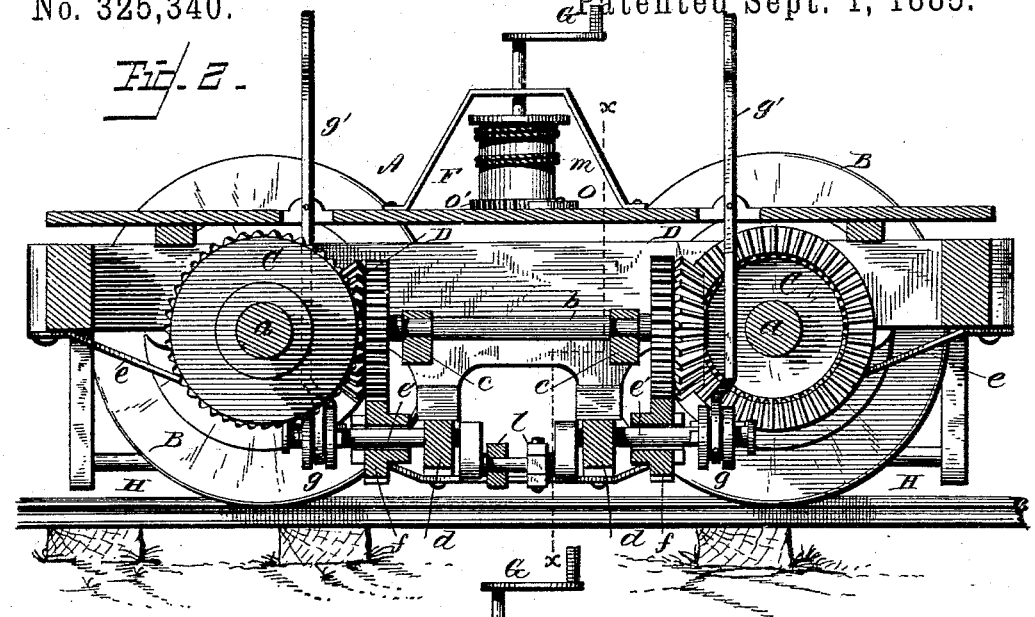
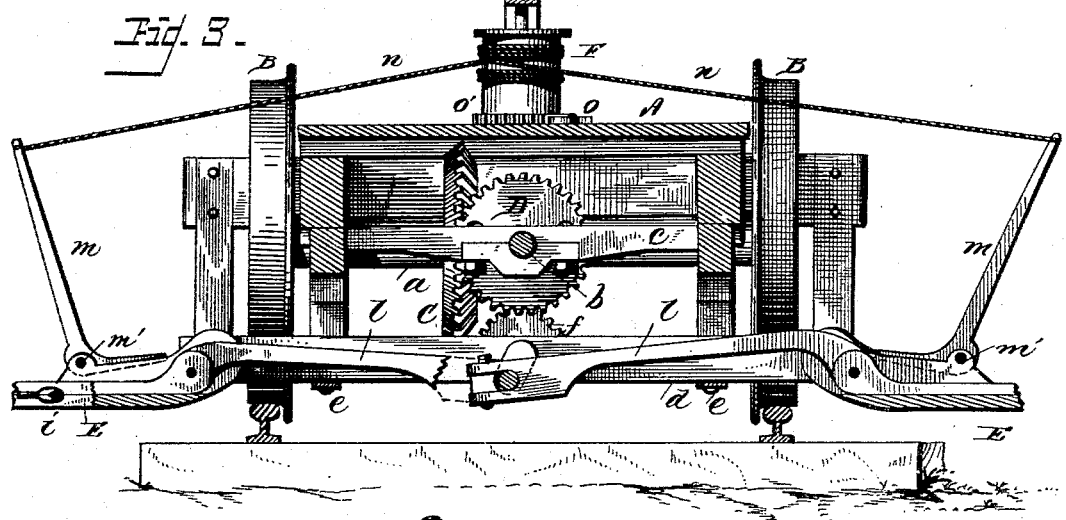
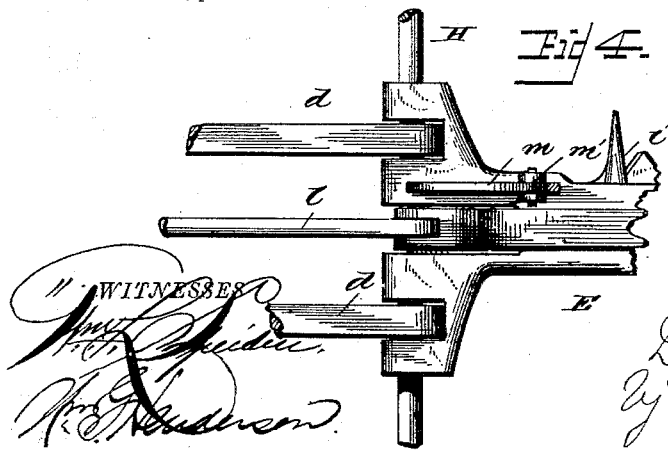
WITNESSES
INVENTOR
Daniel M. Harris
by Franklin H. Hough
Attorney

UNITED STATES PATENT OFFICE.

DANIEL MARION HARRIS, OF ABERDEEN, MISSISSIPPI.

MACHINE FOR CLEARING THE SIDES OF RAILROAD-TRACKS.

SPECIFICATION forming part of Letters Patent No. 325,340, dated September 1, 1885.

Application filed December 15, 1884. (No model.)

*To all whom it may concern:*

Be it known that I, DANIEL M. HARRIS, a citizen of the United States, residing at Aberdeen, in the county of Monroe and State of Mississippi, have invented certain new and useful Improvements in Machines for Clearing the Sides of Railroad-Tracks of Weeds and Grass; and I do hereby declare the following to be a full, clear, and exact description of the invention, such as will enable others skilled in the art to which it appertains to make and use the same.

Various means have been resorted to by railroad-companies for destroying the growth of grass and weeds along the sides of the tracks. Locomotives have been provided with appliances by which heated air and steam have been discharged among them, and not unfrequently resort has been had to the expensive means of removing them by hand labor.

My invention relates to machines for clearing the sides of railroad-tracks from weeds and grass, and has for its object to provide a truck-car which may be moved along the track by means of a locomotive, with mechanism for operating horizontally-reciprocating knives attached to each side of the car, the mechanism being so adjusted as to be readily thrown either in or out of gear while the car is in motion, the angle of the cutter-bar varied at any time either to avoid obstructions or to conform to the surface of the ground along the sides of the track. I accomplish these objects by the means hereinafter specified, reference being had to the accompanying drawings, and letters of reference marked thereon, which form a part of this specification.

Like letters refer to similar parts throughout the several views.

In the accompanying drawings, Figure 1 is a perspective view of my invention, a portion of the platform of the car being broken away. Fig. 2 is a longitudinal section of the machine, showing the details of its construction. Fig. 3 is a transverse section of the same, taken through the line $x\ x$ of Fig. 2. Fig. 4 is a detail view of one of the cutters, its bar, and arm, parts being broken away.

Referring to the drawings, A represents a truck-car provided with flanged wheels B. To each of the axles $a\ a$ is securely keyed a beveled gear-wheel, C. The shaft $b$, supported by cross-timbers $c\ c$, suitably connected to the sides of the car, is provided at each of its ends with beveled gear-wheels D D, having cogs upon their peripheries, the cogs upon their beveled faces being adapted to mesh with cogs upon the gear-wheels C C. The cross-timbers $d\ d$ are bolted to the frame of the car, and are otherwise secured by means of the truss-bars $e\ e$. The pinion-wheels $f\ f$ are loosely mounted upon the crank-shaft $e'$, and mesh with the cogs upon the peripheries of the beveled gear-wheels D D. The ends of the crank-shaft are provided with clutches $g\ g$, which are keyed or otherwise secured so as to prevent the same from turning, and at the same time to permit them to slide upon the shaft. The clutches $g\ g$ may be moved upon the shaft by means of the levers $g'\ g'$, and when thus caused to engage with the loosely-mounted pinions $f\ f$ lock the pinions to the shaft, and motion is thus communicated to the crank-shaft.

Upon each side of the car, arms E are hinged upon rods $h$, suitably secured along the sides of the car. This may be done by passing the same through the outer ends of the cross-timbers $d\ d$, which are extended beyond the sides of the car for that purpose. To these arms are secured finger-bars $i$, which may be of any of the ordinary forms of construction. A reciprocating motion is communicated to the cutter-bar from the crank-shaft by means of the pitman $l$. Each of the arms E E is provided with a crank-lever, $m$, hinged at $m'$, the shorter arm fitting within a groove and bearing upon the upper surface of the arm. To the long arm of the lever a chain or rope, $n$, is attached, which is passed around the capstan F. The operator upon the car may thus readily adjust the angle of the finger-bars at any time by means of the crank G. The pawl $o$, which is attached to the platform of the car, is adapted to engage with the ratchet-wheel $o'$ upon the capstan and thus lock the same at the desired point of adjustment.

Having thus described my invention and set forth its merits, what I claim as new is—

1. The combination, with the car provided with a cutter-bar upon each side, of gear-wheels C C, mounted upon the axles of the car-wheels, the shaft $b$, provided with the pinions D D, meshing with said gear-wheels, the crank-shaft $e'$, connected with the cutters and having loosely-mounted pinions $f\,f$, the sliding clutches $g\,g$, and levers for operating said clutches, substantially as and for the purposes set forth.

2. The combination, with a car provided with a cutter-bar upon each side, of gear-wheels C C, mounted upon the axles of the car-wheels, the shaft $b$, provided with the pinions D D, meshing with said gear-wheels, the crank-shaft $e'$, connected with the cutters and having loosely-mounted pinions $f\,f$, the sliding clutches $g\,g$, and levers for operating said clutches to throw either of the cutters into operation, and a pawl-and-ratchet capstan, and connection between said capstan and the cutter-bars, substantially as and for the purpose described.

In testimony whereof I affix my signature in presence of two witnesses.

DANIEL MARION HARRIS.

Witnesses:
    J. W. CRUMP,
    E. O. HALLADEY.